May 29, 1923.
G. W. NICHOLSON ET AL
1,457,263
AUTOMOBILE SIGNAL
Filed April 4, 1919
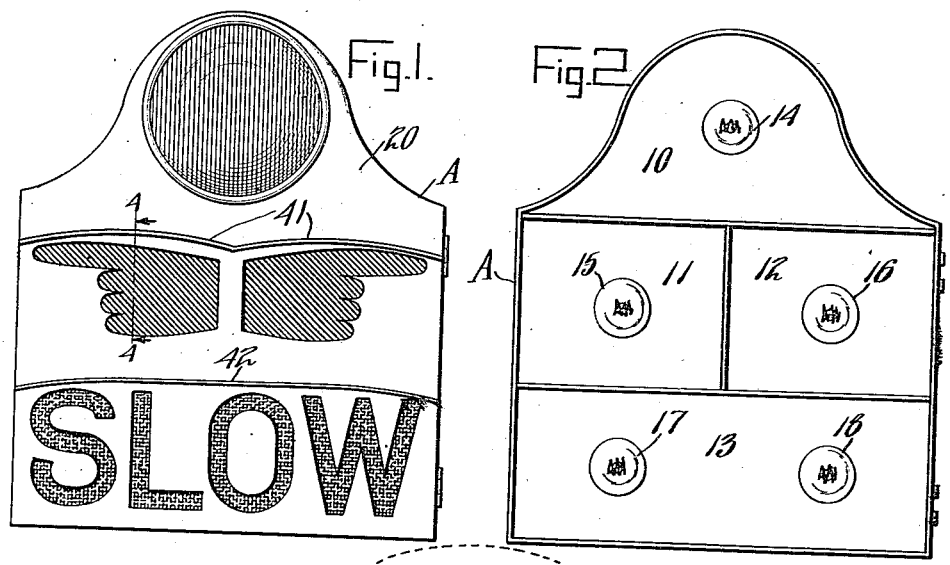
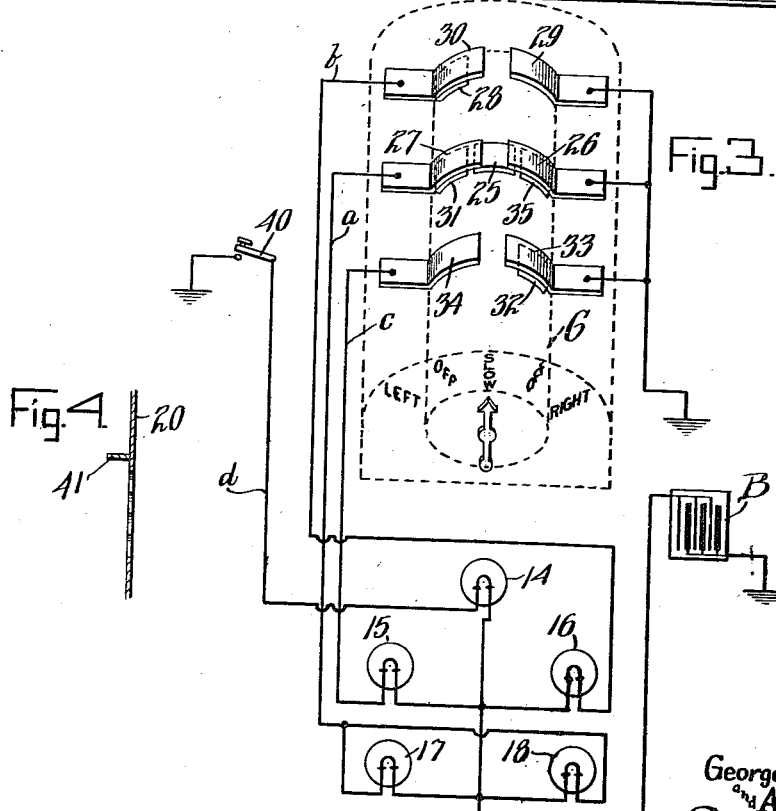
Inventors
George W. Nicholson
and Arthur J. Kelley.
By
Attorney

Patented May 29, 1923.

1,457,263

UNITED STATES PATENT OFFICE.

GEORGE WASHINGTON NICHOLSON AND ARTHUR JAMES KELLY, OF INDIANAPOLIS, INDIANA, ASSIGNORS TO SAFETY FIRST AUTO TAIL-LIGHT COMPANY, OF INDIANAPOLIS, INDIANA, A CORPORATION OF INDIANA.

AUTOMOBILE SIGNAL.

Application filed April 4, 1919. Serial No. 287,511.

*To all whom it may concern:*

Be it known that we, GEORGE W. NICHOLSON and ARTHUR J. KELLY, citizens of the United States, residing at Indianapolis, in the county of Marion and State of Indiana, have invented certain new and useful Improvements in Automobile Signals, of which the following is a specification.

The purpose of our said invention is to provide a signal for the rear of automobiles or other vehicles by which the driver, through the operation of a single switch, may indicate to vehicles approaching from the rear, which way he is going to turn and when it is necessary to slow down speed, and this without any inconvenience or exposure of any part of the hand, arm, or body, and it consists in various improvements in the details of construction and arrangement of the parts of signals of the class referred to whereby this purpose may be accomplished in a very convenient and simple manner, all as will hereinafter be more fully described and claimed:

Referring to the accompanying drawing which is made a part hereof, and on which similar reference characters indicate similar parts, Figure 1 is a face elevation of a signal box or casing as it appears when complete and ready for attachment to a vehicle.

Figure 2, a view of said box with the face plate removed, showing the interior arrangement and the lamps, Figure 3, a diagrammatic view, shows the wiring scheme and the switch whereby said signals may be operated as desired from a single point, as on the steering post or dashboard of the vehicle, and Figure 4, a detail view on the dotted line 4—4 in Figure 1.

In said drawings, the portions marked A represent the casing, B the battery, and C the switch.

The casing A is a box-like structure of appropriate form, that illustrated by the Figures 1 and 2 being preferred. This casing is divided into compartments 10, 11, 12 and 13. The back of the casing has appropriate sockets for the lamps and supports for the wiring system. Electric lamps are mounted in the sockets in the respective compartments as follows: a lamp 14 in compartment 10, a lamp 15 in compartment 11, a lamp 16 in compartment 12, and two lamps 17 and 18 in compartment 13.

The face plate 20 is mounted on said casing, preferably formed with apertures of various forms, as will be presently described, over each of said compartments, said apertures being filled with transparent material, as glass or isinglass. Over the compartment 10 and in line with lamp 14, the aperture is circular in form and filled with transparent material of red color, same being intended as a substitute of the ordinary red tail-light of an automobile, and to signify "danger" when lighted. Over compartments 11 and 12, and in line with lamps 15 and 16 respectively, are formed apertures in the form of hands with one finger extended, the respective fingers being pointed in opposite directions, or toward the respective sides of the casing. These apertures are filled with isinglass, green in color, and when the lamp behind one or the other is lighted, the transparent hand shows green and indicates that the automobile is about to turn in the direction indicated by the pointing finger of the hand. Over the compartment 13 are cut apertures in the form of letters forming the word "Slow," which apertures are filled with isinglass of yellow color. The lamps 17 and 18 are on the same circuit and both are intended for use when the "Slow" sign is to be displayed. The same result may be obtained by the use of a single lamp, but we find two lamps are more satisfactory in operation because of the length of the word, and the advantage of having the signal show clearly and brightly for its entire length. Just above each hand is an overhanging "hood" 41 and above the word "Slow" a similar hood 42. Said hoods serve to shade or throw these signals into the background and give a day as well as a night signal.

By referring to Figure 3, the arrangement for lighting the lamps and displaying the several signals will be clearly understood. When the switch cylinder C is turned so that the arrow points to "Slow" on the dial as indicated in the figures, the bridge-piece 25 will connect the terminals 26 and 27, and close circuit *a* through lamps 17 and 18, lighting said lamps and displaying "Slow" signal indicating to an approaching car that the car displaying the signal is about to slow down its speed.

When the driver is about to turn to the right, the switch is turned until the arrow points to the word "Right" on the dial, which brings the bridge-piece 28 to position to connect the terminals 29 and 30, and close the circuit *b* through lamp 16, lighting said lamp and displaying the signal of the hand pointing to the right, at the same time, another bridge-piece 31 spans the gap between terminals 26 and 27 and maintains the display of the "Slow" signal. When it is desired to turn to the left, the switch is turned until the arrow points to the word, "Left" on the dial, which brings bridge-piece 32 into position to connect the terminals 33 and 34, closing circuit *c* through lamp 15, and displaying the signal of the hand pointing to the "Left". At the same time another bridge-piece 35 spans the gap between terminals 26 and 27, maintaining circuit *a* closed, and the "Slow" signal displayed.

When the switch is turned so that the arrow points to "Off" on the dial all connections are broken and all circuits open.

A separate switch 40 is preferably provided for closing the circuit *d* through lamp 14, and displaying the red or danger signal, this being a signal which is intended to be lighted constantly as a tail light, and not necessarily related to the other signals, except as incorporated in the same structure, which as thus formed is not only complete for all the purposes desired, but neat in appearance, and of a size not to be objectionable.

The current for the several circuits is supplied from a battery B as indicated, which may be an ordinary storage battery on the car, or any appropriate battery desired.

With such a signal, as will be readily seen, the operator is able to display the "Slow" signal when approaching a point where it is necessary to slow down speed, without displaying either of the turning signals, and when he is about to turn either to the right or to the left, he is able to indicate the direction of his turn to the approaching car without confusion and by the operation of but a single switch, while at the same time displaying the "Slow" signal, which is always advisable when making a turn. By such an apparatus, the necessity of extending the hand, as well as the inconvenience of this mode of signalling, is avoided, and a signal provided that is as convenient for use in closed cars as in other cars with the consequent advantages.

Having thus fully described our said invention, what we claim as new and desire to obtain by Letters Patent, is:

In a vehicle signaling mechanism, a caution signal, a right-turn signal, a left-turn signal, circuits therefor having spaced contacts, and a drum member having a single bridge piece for the contacts of each of the turn signals, and a plurality of bridge pieces for the contacts of the caution signal, including a bridge-piece in alinement with each of the turn-signal bridge-pieces, the opposed contacts being symmetrically disposed about the axis of the drum member, substantially as set forth.

In witness whereof, we have hereunto set our hands and seals at Indianapolis, Indiana, this 26th day of March, A. D. nineteen hundred and nineteen.

GEORGE WASHINGTON NICHOLSON. [L. S.]
ARTHUR JAMES KELLY. [L. S.]

Witnesses:
M. L. SHULER,
MARTHA MARTINDALE.